United States Patent [19]

Takimoto

[11] Patent Number: 4,683,503
[45] Date of Patent: Jul. 28, 1987

[54] INFORMATION SIGNAL REPRODUCING APPARATUS HAVING MEANS FOR DISCRIMINATING A TRACK PITCH AND SELECTING THE REPRODUCTION MODE SPEED

[75] Inventor: Hiroyuki Takimoto, Kanagawa, Japan

[73] Assignee: Canon Kabushiki Kaisha, Tokyo, Japan

[21] Appl. No.: 686,201

[22] Filed: Dec. 26, 1984

[30] Foreign Application Priority Data

Dec. 28, 1983 [JP] Japan ............................. 58-245336

[51] Int. Cl.⁴ ..................... G11B 15/14; G11B 5/52; G11B 15/52
[52] U.S. Cl. .................................. 360/64; 360/70; 360/73
[58] Field of Search .................... 360/10.2, 27, 10.3, 360/18, 70, 69, 73, 71, 77, 119.1, 84, 64, 20, 33.1; 358/310, 321, 323

[56] References Cited

U.S. PATENT DOCUMENTS

| | | | |
|---|---|---|---|
| 4,056,832 | 11/1977 | De Boer et al. | 360/77 |
| 4,237,500 | 12/1980 | Sanderson | 360/77 |
| 4,297,733 | 10/1981 | Sanderson | 360/77 |
| 4,306,261 | 12/1981 | Bergmans et al. | 360/70 |
| 4,309,730 | 1/1982 | Sanderson | 360/77 |
| 4,364,097 | 12/1982 | De Boer et al. | 360/70 |
| 4,414,586 | 11/1983 | Hirota et al. | 360/70 |
| 4,439,799 | 3/1984 | Haubrich et al. | 360/77 |
| 4,497,000 | 1/1985 | Terada et al. | 360/70 |
| 4,509,083 | 4/1985 | Nakano | 360/77 |
| 4,550,345 | 10/1985 | Terada et al. | 360/73 |

Primary Examiner—Raymond R. Cardillo
Assistant Examiner—Steven R. Garland
Attorney, Agent, or Firm—Toren, McGeady & Associates

[57] ABSTRACT

An information signal reproducing apparatus for tracing a recording medium on which a large number of recording tracks having four kinds of pilot signals with different frequencies from one another recorded successively on each one of the tracks together with information signals are formed with such track pitch as selectively determined from a plurality of track pitches and for respectively detecting the above-mentioned four kinds of pilot signals included in the signals reproduced by the head for reproducing the above-mentioned information signals, thus making a discrimination of the track pitches by outputs of such detections.

20 Claims, 10 Drawing Figures

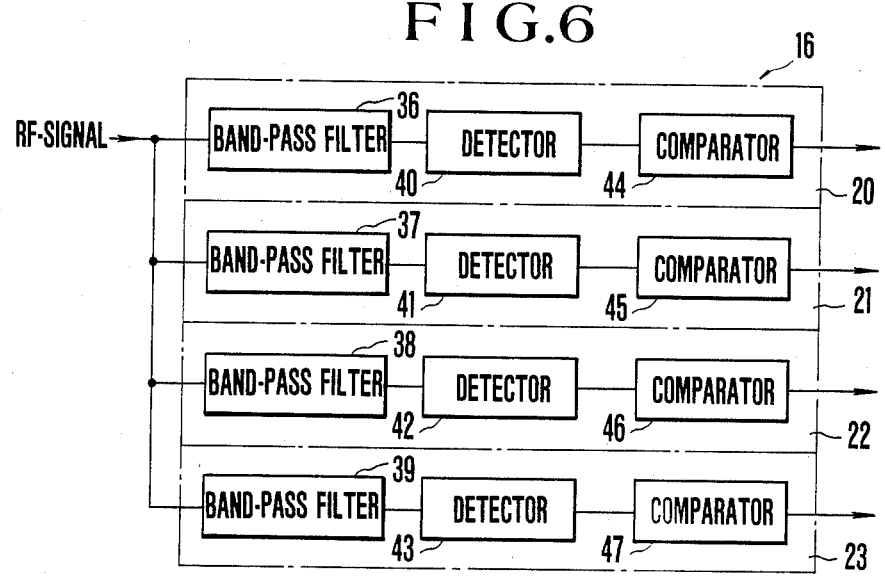
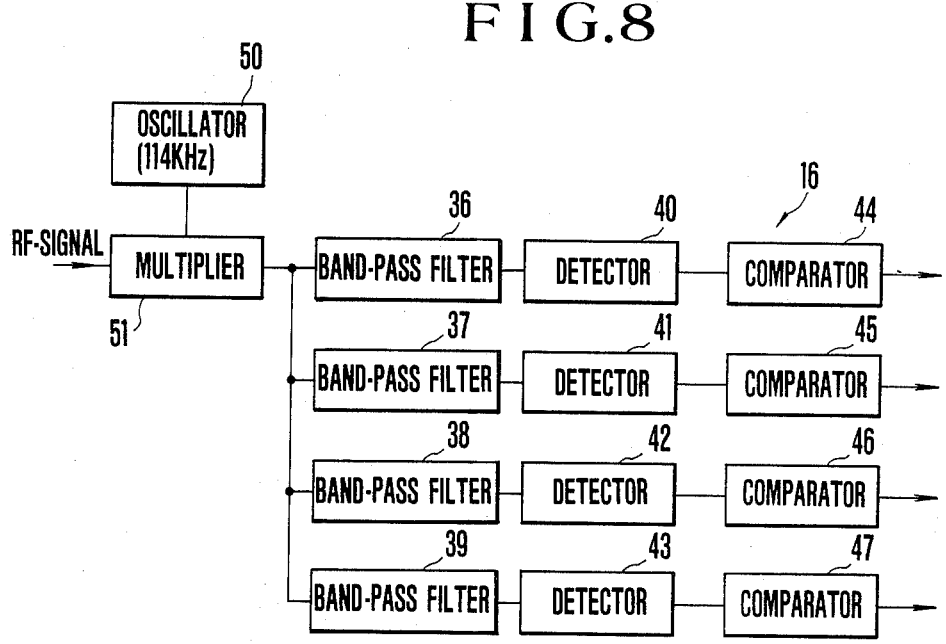

INFORMATION SIGNAL REPRODUCING APPARATUS HAVING MEANS FOR DISCRIMINATING A TRACK PITCH AND SELECTING THE REPRODUCTION MODE SPEED

BACKGROUND OF THE INVENTION

1. Field of the Invention

This invention relates to an information signal reproducing apparatus, and more particularly, to an information signal reproducing apparatus in which, from the recording medium on which composite signals formed by superimposing a plurality of pilot signals having different frequencies from one another successively on information signals in a one-to-one relationship with the tracks were recorded, and from which said information signals are reproduced.

2. Description of the Prior Art

In the art of video tape recorders (hereinafter called VTR) of the kind in which video signals are recorded while video tracks are formed obliquely with respect to the longitudinal direction of the magnetic tape, or of the so-called helical scan type, depending on the recording format for control of tracking in reproduction, there are the following two types: One being that of which a control signal (hereinafter called CTL) is previously recorded in the vicinity of the edge of the tape (which is hereinafter referred to as "CTL" type), and another type of which each of four pilot signals of different frequencies is recorded in a video track, respectively, in superimposing relation to the video signals (hereinafter referred to as "4f" type). Both types of VTRs have been commercialized.

Further, in the art of VTRs of the aforementioned CTL type, a VTR having a low speed (LP) mode in which the tape speed during recording is reduced to a fraction of that of the standard tape speed and the video track pitch is made narrower, thus resulting in a great increase in the total recording time for the same tape cassette, has already been commercialized.

Needless to say, during reproduction, the video tape which was recorded by a VTR of this kind, or having the standard recording mode (SP mode) and LP mode, must be moved at the same speed as when it was recorded. The reproduction apparatus using the CTL type recording media is constructed such that the tape is first moved at a certain speed to reproduce the CTL from which the tape speed that was used during recording is determined, thereby matching the running speed of the tape during reproduction with the speed at which the same tape was recorded.

In the aforementioned 4f type of VTRs, although able to be recognized as having the high density recording technique, because the aforementioned CTL was not recorded, a signal which directly represents the video track pitch cannot be obtained. Therefore, the speed at which the tape was moved during recording cannot be automatically examined. For this reason, in the present state of the art, reproduction apparatuses adapted to be used with the 4f type of recording media generally have only one moving speed for the tape.

SUMMARY OF THE INVENTION

In consideration of the above-described drawbacks, the present invention has been made, its object being to provide an information signal reproducing apparatus capable of determining the track pitch even when a signal directly representing the track pitch cannot be obtained.

Another object of the present invention is to provide an information signal reproducing apparatus in which the moving speed of the recording medium is automatically adjusted to the same value as that of when it was recorded, and the tracking is always operated with high accuracy when the information signals are reproduced.

Still another object of the present invention is to provide an information signal reproducing apparatus capable of obtaining good reproduced signals from either of two recording media having different track pitches from each other and no signals which directly represent the track pitches.

With such an object in mind, according to the present invention, what is proposed as one of the embodiments is an information signal reproducing apparatus using the recording medium on which composite signals, formed by superimposing a plurality of pilot signals having different frequencies from one another successively on the information signals in one-to-one relationship with the tracks were recorded, and from which said information signals are reproduced, comprising; reproducing means for reproducing said composite signals from said recording medium, separation means for separating said information signals from the reproduced composite signals by use of said reproducing means, and detecting means for detecting each of said plurality of pilot signals from the reproduced composite signals by use of said reproducing means.

These and other objects and features of the present invention will become apparent from the following detailed description of the embodiments thereof with reference to the accompanying drawings.

BRIEF DESCRIPTION OF THE DRAWINGS

FIG. 6 illustrates a practical example of the pilot signal detecting circuit of FIG. 5.

FIG. 8 illustrates another practical example of the pilot signal detecting circuit shown in FIG. 5.

DETAILED DESCRIPTION OF THE PREFERRED EMBODIMENTS

Figure 1:
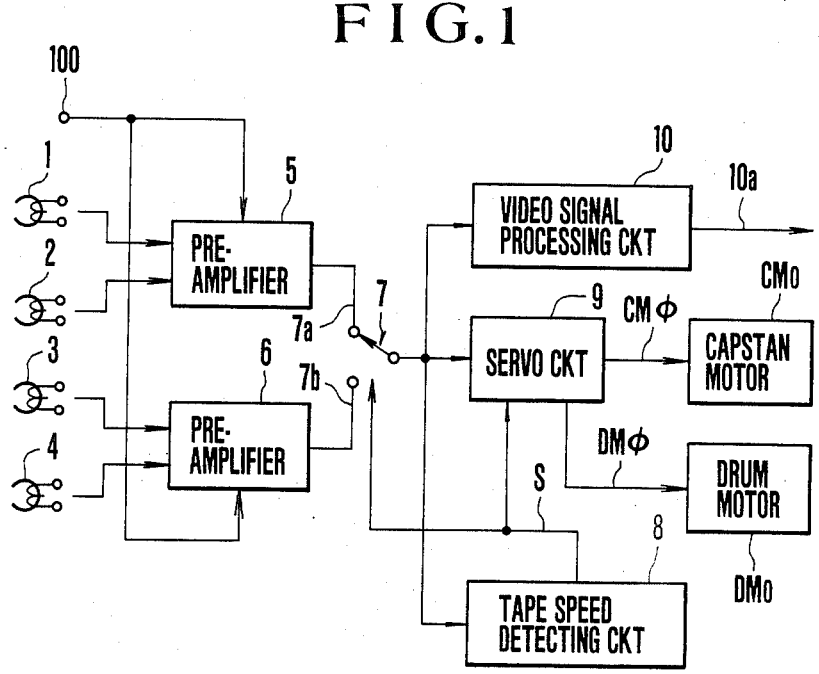
FIG. 1 is a block diagram illustrating the outline of the main parts of an embodiment of a VTR according to the present invention.

In FIG. 1 one embodiment of the invention applied to a VTR is shown, in which two pairs of recording and reproducing magnetic heads 1 and 2, and 3 and 4 having different azimuths from each other are mounted to a rotary drum in a fasion as known in the art. A first pre-amplifier 5, selectively receptive of the output signals of the aforementioned magnetic heads 1 and 2, depending on the drum rotation detecting signal supplied to a terminal 100, produces a continuous signal after said output signals are amplified. A second pre-amplifier 6, selectively receptive of the output signals of the aforementioned magnetic heads 3 and 4, produces a continuous signal after said output signals are amplified. A switch 7 has two throws connected to the respective outputs of the pre-amplifiers 5 and 6 and one pole connected to a tape speed detecting circuit 8. A tape speed detecting signal S produced from this tape speed detecting circuit 8 and the output signal of the switch 7 are utilized by a servo circuit 9 to control a capstan motor CM0 and a drum motor DM0. From the RF signal produced from the switch 7, the original signal form (for example, the form of television signals) is regained by a video signal processing circuit 10. 10a denotes the reproduced video signals. CMØ and DMØ denote the two outputs of the aforementioned servo circuit 9 to the CM0 and DM0, respectively.

Figure 2:
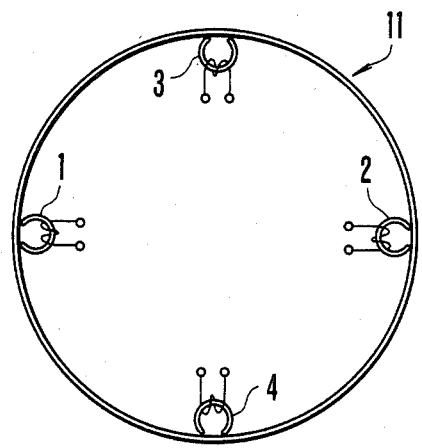
FIG. 2 illustrates an arrangement of magnetic heads.

As shown in FIG. 2, the magnetic heads 1 to 4 are arranged on the drum 11, in an opposed relation in each pair. The width of each of the magnetic heads 3 and 4 is adjusted to be slightly wider than the video track pitch (Ta in FIG. 4(a)) formed during recording with the tape moved at the standard speed, or the video track pitch for the SP mode. On the other hand, the width of each of the magnetic heads 1 and 2 is adjusted to be wider than the track pitch (Tb in FIG. 4(b)) formed during recording with the tape moved at ½ the amount of time of the aforementioned standard speed, or the video track pitch in this VTR, and narrower than the Ta. By use of such a head construction and arrangement, it becomes possible to achieve a so-called azimuth guard bandless recording in each of the SP mode and the LP mode of which the latter is operated at one half of the standard tape moving speed.

Figure 3:
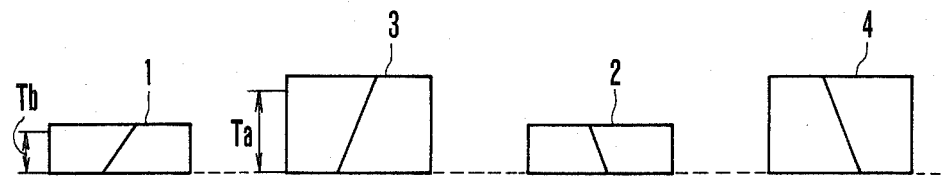
FIG. 3 illustrates the widths of the magnetic heads in relation to the video track pitches according to the VTR of this embodiment.

FIG. 3 schematically illustrates the correspondence of the head widths of the magnetic heads 1 to 4 to the pitches (Ta, Tb) of the video tracks. As is obvious from the foregoing, this pitch Ta is equal to 2 times that of the pitch Tb.

Figure 4A:
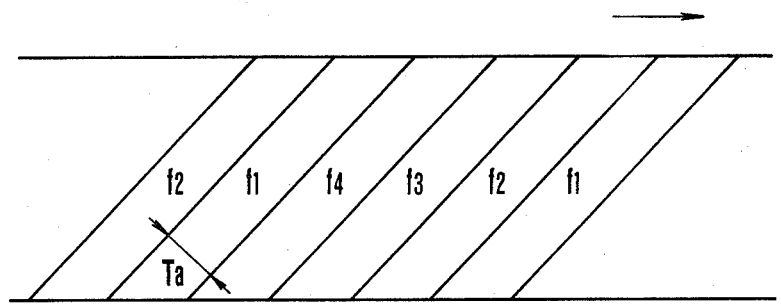
FIGS. 4(a) and 4(b) illustrate the recording formats by the VTR of this embodiment.
Figure 4B:
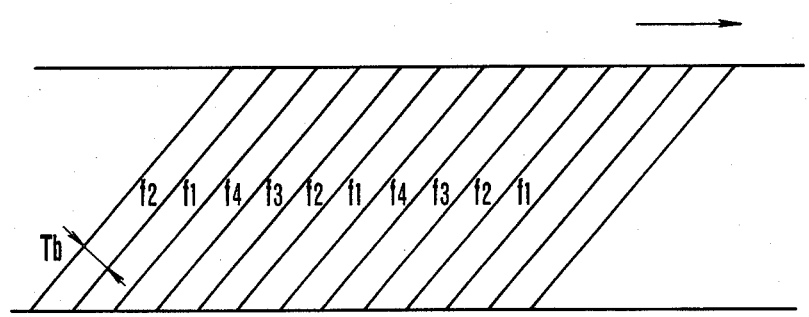

FIGS. 4(a) and 4(b) schematically illustrate the recording patterns on the video tapes by the VTR of this embodiment, where f1 to f4 denote the recorded video tracks with the superimposition of pilot signals having different frequencies f1 to f4 from one another, respectively. The recording patterns of FIGS. 4(a) and 4(b) are made when in SP and LP modes, respectively.

Figure 5:
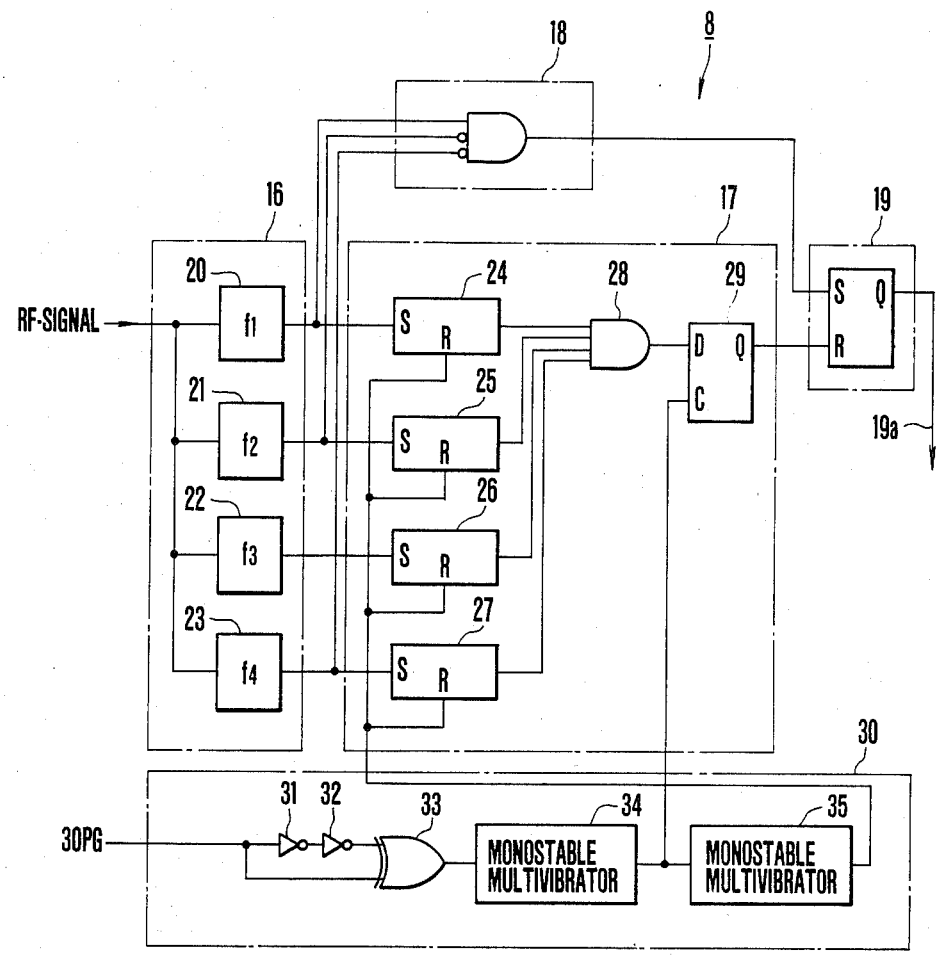
FIG. 5 illustrates a practical example of the tape speed detecting circuit of FIG. 1.

Next, the details of an example of the aforementioned tape speed detecting circuit 8 is shown in FIG. 5, comprises a pilot signal detecting circuit 16 for detecting four pilot signals independently of one another, a first speed error detecting circuit 17 using the detection signal of the pilot signal detecting circuit 16 to detect the fact that the four pilot signals have been reproduced within the period of one field, a second speed error detecting circuit 18 using the detection signal of the aforementioned pilot signal detecting circuit 16 to detect the fact that two or more of the pilot signals have not been reproduced at the same time, and a control circuit 19 receptive of output signals of these speed error detecting circuits 17 and 18 for producing a signal for change-over between the reproduction modes. When the output of said control circuit 19, or the reproduction mode change-over signal 19a, is at a high (H) level, the SP mode is operated. When it is at a low (L) level, the LP mode is operated. The signal 19a is used for controlling the capstan motor CM0 so that the moving speed of the tape is changed over, and also for controlling the operation of the switch 7 of FIG. 1 so that the heads to be used in reproduction are changed over.

As a result, the reproduction mode is changed over between the SP and LP modes.

The aforementioned pilot signal detecting circuit 16 includes single-frequency signal detecting circuits 20 to 23 for detecting the four pilot signals f1 to f4, respectively. The first speed error detecting circuit 17 includes flip-flop circuits 24 to 27 connected to the detecting circuits 20 to 23, respectively, an AND circuit 28 for taking the logical product of the outputs of these flip-flop circuits 24 to 27, and a D-flip-flop circuit 29 connected to the output side of this AND circuit 28. As the second speed error detecting circuit 18, for example, such a 3-input inhibit circuit as shown in FIG. 5 is used.

30 is a pulse generating circuit for producing pulses which are applied to the first speed error detecting circuit 17, including a series-connected circuit of buffer inverters 31 and 32, an exclusive OR circuit 33 connected to this circuit, and monostable multivibrators 34 and 35 connected to this exclusive OR circuit 33.

Each of the detecting circuit 20 to 23 of the aforementioned pilot signal detecting circuit 16 includes, as shown in FIG. 6, band pass filters 36 to 39 for selectively passing the aforementioned four pilot signals f1 to f4, detectors 40 to 43 serially connected to these band pass filters 36 to 39, respectively, and comparators 44 to 47 connected to the output sides of these detectors 40 to 43, respectively, to compare these outputs with a reference level.

In the following, an explanation is made about the change-over operation between the SP mode and the LP mode.

Figure 7A:
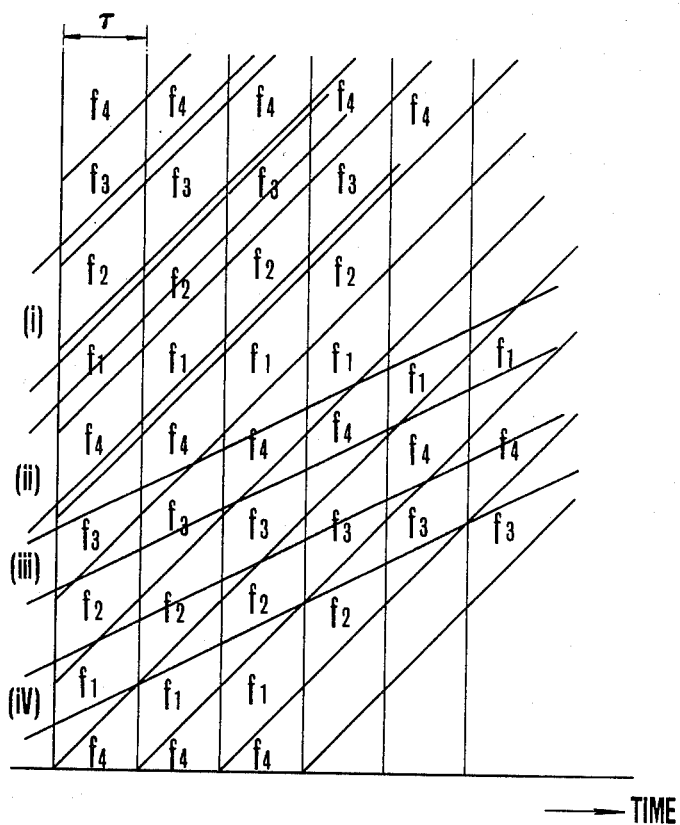
FIGS. 7(a) and 7(b) are diagrams relating respectively the recording tracks of SP and LP modes with the tracing positions of the reproducing heads.
Figure 7B:
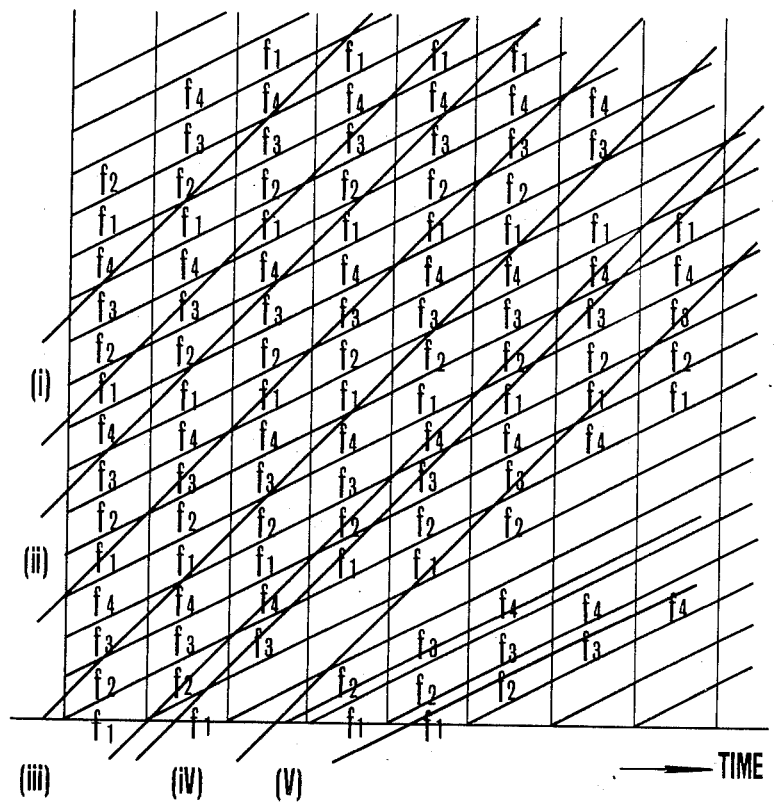

FIGS. 7(a) and 7(b) are the pattern diagrams schematically illustrating how the head traces when in the SP mode and LP mode, respectively. In each diagram, the abscissa represents the elapse of time, and the ordinate is taken in the direction of transportation of the tape. $\tau$ is one field period (1/60 sec.) and f1, f2, f3 and f4 in the same figures indicate the respective portions of the superimposed pilot signals having the frequencies f1, f2, f3 and f4.

At first, when the four pilot signals f1 to f4 recorded in the SP mode are to be reproduced in the LP mode, such tracing paths as shown by (iii) and (iv) of FIG. 7(a) occur. In (i) to (iv) of FIG. 7(b) the tracing paths at a time when the pilot signals f1 to f4 recorded in the LP mode are reproduced in the SP mode are shown. (i) and (ii) of FIG. 7(a) indicate the tracing paths when the pilot signals f1 to f4 recorded in the SP mode are reproduced in the SP mode. In either of the on-tracking and off-tracking states (i) and (ii), two or three of the pilot signals are reproduced at the same time. Conversely, when reproduced in the LP mode, as shown by (iii) and (iv), though one or two of the pilot signals is or are reproduced at the same time, a timing occurs such that only one of the pilot signals is reproduced at least once for every two fields.

In FIG. 7(b), (i) to (iv) show the tracing paths when the video tracks recorded in the LP mode are reproduced in the SP mode.

Because the head width of the magnetic heads 3 and 4 is wider than 2 times the track pitch Tb for the LP mode, all of the four pilot signals f1 to f4 are reproduced within one field, independently of the phase of the magnetic heads 3 and 4.

Conversely when reproduced in the LP mode, however, as shown in (v) of FIG. 7(b), two or three of the pilot signals are always reproduced at the same time. Therefore, as the reproduction goes into the SP mode when all of the pilot signals f1 to f4 are reproduced within one field, the apparatus has to be switched to the LP mode. As the reproduction goes into the LP mode, when only one frequency is reproduced at the same time, the apparatus has to be switched to the SP mode.

Next, this switching operation is explained with reference to FIGS. 5 and 6.

At first, an explanation is given for a case in which reproduction is taking place in the SP mode. When in the SP mode, the output of the control circuit 19 takes a high (H) level. At this time, applied to the pulse forming circuit 30 is a rectangular wave signal of 30 Hz (hereinafter called 30PG) synchronized with the phase of rotation of the drum from a pulse generator (not shown). This 30PG is converted, when passing through the buffer inverters 31 and 32 and the exclusive OR circuit 33, to triggering pulses on the basis of the rising and falling edges of each input pulse. These triggering pulses are applied to the monostable multivibrator 34 which produces other pulses. These other pulses are applied to the "clock" terminal of the flip-flop 29 of the first speed error detecting circuit 17. If, at this time, the track recorded in the SP mode is reproduced, a situation never occurs in which all of the four pilot signals f1 to f4 are reproduced within one field. Therefore, at least one of the flip-flop circuit 24 to 27 remains reset during one field period. Thereby the output of the AND circuit 28 goes to the L level, and the output of the D-flip-flop circuit 29 also goes to the L level. Thus, the control circuit 19 is left set, permitting the SP mode of reproduction to continue.

Next, when the track recorded in the LP mode is reproduced in the SP mode, the four pilot signals f1 to f4 are all reproduced within one field. At a point in time when the output of the monostable multivibrator 34 goes to the H level, the flip-flop circuits 24 to 27 are all at the H level. Therefore, the AND circuit 28 as well as the D-flip-flop circuit 29 go to the H level. Responsive to this, the control circuit 19 changes its output from the H to the L level, causing the apparatus to be switched from the SP to the LP mode.

In a case where the track recorded in the LP mode is reproduced in the LP mode, a situation does not occur in which the four pilot signals f1 to f4 are all reproduced within one field, and thaty only one of the pilot signals is reproduced. For example, when the pilot signal f1 is being reproduced, it is certain that another one of the pilot signals (f2 or f4) is being reproduced.

Next, when the track recorded in the SP mode is reproduced in the LP mode, it is certain that the timing exists in which only one of the pilot signals is reproduced either once, or twice for every two fields. Therefore, if the reproduction of the pilot signal f1 does not coincide with the reproduction of other pilot signals f2, f4, the output of the detecting circuit 20 goes to the H level, and, if the outputs of the detecting circuits 21 and 23 are at the L level, the output of the third detecting circuit 18 goes to the H level. Thereby, the output of the control circuit 19 is inverted from the L to the H level, causing the apparatus to be switched to the SP mode.

Here, a more detailed explanation is given to the aforementioned detecting circuits 20 to 23. The reproduced RF signal after having been amplified in passing through the pre-amplifier 5(or 6) is supplied to each of the band pass filters 36 to 39 as shown in FIG. 6 where the pilot signal f1–f4 components are separated. These are respectively rectified by the detectors 40 to 43 to D.C. outputs. These D.C. outputs are compared with a reference level by the comparators 44 to 47. On the basis of the outputs of the comparators 44 to 47, the reproduction apparatus is automatically changed over between the two modes.

The aforementioned band pass filters 36 to 39 of each of the single-frequency detecting circuits 20 to 23 constituting the pilot signal detecting circuit 16 extract the front pilot signals f1–F4. With the pilot signals f1–F4 taken at, for example, f1=102.5 KHz, f2=118.9 KHz, f3=165.1 KHz and f4=147.8 KHz, however, because the values of the frequencies of the pilot signals f1–f4 are so close to each other, the detection outputs are liable to be erroneous. Another disadvantage is that the construction of the band pass filters 36 to 39 often becomes complicated.

To avoid this, a modification may be considered as shown in FIG. 8, where the reproduced pilot signals f1–f4 are multiplied by a signal from another oscillator 50 (for example, its frequency of oscillation is set at 114 KHz) by a multiplier 51. Then, as a result, the frequencies of the pilot signals f1 to f4 are changed so that the difference components due to f1–f4 are respectively 11.5 KHz, 4.9 KHz, 61.1 KHz and 33.8 KHz, and the sum components are all above 216.5 KHz. Hence, use is made of these difference components as the inputs of the band pass filters 36 to 39. This is advantageous in that the detection error in the band pass filters 36 to 39 can be reduced.

Though the foregoing first and second embodiments have been described in connection with a ratio of the video track pitches of 2:1 for the SP and LP modes beteween which the reproduction apparatus is automatically changed over, the present invention is of course applicable to any other type of reproduction apparatus of which the automatic mode selection is effected for the two track pitches in a ratio of 3:1 by properly adjusting the ratio of the head widths of the magnetic heads 1 to 4 and the ratio of the moving speeds of the tape without further alternation.

It is also possible to provide, in the apparatus, means for displaying the aforementioned speed detection error.

Further, the second speed error detecting circuit 18 for detecting the fact that only one pilot signal is reproduced is made receptive of the detection outputs for the three pilot signals. Such a fact can be otherwise detected by using only two detection outputs for the two of the pilot signals which were superimposed respectively onto the two adjacent tracks. (As in the case of the above-described embodiments, f1 and f3, or f2 and f4). In this case, when these two detection outputs are not simultaneously obtained (below a prescribed value), it follows that only one of the pilot signals is reproduced.

What is claimed is:

1. An information signal reproducing apparatus for reproducing information signals from a recording medium in which a large number of recording tracks, each having one of four kinds of pilot signals with different frequencies recorded successively on each track together with said information signals, are formed with either a first track pitch or a second track pitch, comprising:
   (a) a first head having a head width which corresponds to said first track pitch;
   (b) a second head having a head width which corresponds to said second track pitch;

(c) switching means for producing either of a signal reproduced by said first head from said recording medium and a signal reproduced by said second head from said recording medium, thus producing a reproduction signal;

(d) four detecting means for respectively detecting said four kinds of pilot signals included in said reproduction signal to produce four detecting signals;

(e) discriminating means for discriminating that all of said four kinds of pilot signals are included in said reproduction signal produced within a prescribed period of time based on said four detection signal; and (f) switching control means arranged to change over the reproduction signal produced by said switching means between the signal reproduced by said first head and the signal reproduced by said second head in response to said discriminating means.

2. An apparatus according to claim 1, wherein said switching control means is arranged to change over said reproduction signal produced by said switching means from the signal reproduced by said first head to the signal reproduced by said second head which has a narrower head width than that of said first head when it is discriminated by said discriminating means that said four kinds of pilot signals are all included in said reproduction signal within a prescribed period of time.

3. An apparatus according to claim 1, further comprising moving means for moving said recording medium.

4. An apparatus according to claim 3, further comprising means for changing over the moving speed of said recording medium by said moving means between a first speed corresponding to said first track pitch and a second speed corresponding to said second track pitch based on said four detection signals.

5. An apparatus according to claim 4, wherein said recording medium is tape-shaped and said moving means is arranged to move said tape-shaped recording medium in its longitudinal direction.

6. An apparatus according to claim 5, wherein said first head and second head are rotating heads obliquely tracing said tape-shaped recording medium.

7. An information signal reproducing apparatus for reproducing information signals from a recording medium in which a large number of recording tracks, each having one of four kinds of pilot signals with different frequencies recorded successively on each track together with said information signals, are formed with either a first track pitch or a second track pitch, comprising:

(a) a first head having a head width which corresponds to said first track pitch;

(b) a second head having a head width which corresponds to said second track pitch;

(c) switching means for producing either of a signal reproduced by said first head from said recording medium and a signal reproduced by said second head from said recording medium, thus producing a reproduction signal;

(d) four detecting means for respectively detecting said four kinds of pilot signals included in said reproduction signal to produce four detecting signals;

(e) discriminating means for discriminating that only one kind out of said four kinds of pilot signals is included in said reproduction signal based on at least three of said four detection signals; and (f) switching control means arranged to change over the reproduction signal produced by said switching means between the signal reproduced by said first head and the signal reproduced by said second head in response to said discriminating means.

8. An apparatus according to claim 7, wherein said switching means is arranged to change over the reproduction signal produced by said switching means from the signal reproduced by said second head to the signal reproduced by said first head which has a wider width than that of said second head when it is discriminated by said discriminating means that only one kind out of said four kinds of pilot signals is contained in said reproduction signal.

9. An apparatus according to claim 7, further comprising moving means for moving said recording medium.

10. An apparatus according to claim 9, further comprising means for changing over the moving speed of said recording medium by said moving means between a first speed corresponding to said first track pitch and a second speed corresponding to said second track pitch based on said four detection signals.

11. An apparatus according to claim 10, wherein said recording medium is tape shaped and said moving means is arranged to move said tape shaped recording medium in its longitudinal direction.

12. An apparatus according to claim 11, wherein said first head and second head are rotating heads obliquely tracing said tape shaped recording medium.

13. An information signal reproducing apparatus for reproducing information signals from a recording medium in which a large number of recording tracks, each having one of four kinds of pilot signals with different frequencies recorded successively on each track together with said information signals, are formed with either a first track pitch or a second track pitch, comprising:

(a) head means for tracing said recording medium for reproducing said information signals;

(b) moving means for moving said recording medium;

(c) means for detecting that said four kinds of pilot signals are all included in the signals reproduced by said head means within a prescribed period of time; and (d) means for changing over the moving speed of said recording medium by said moving means between a first speed corresponding to said first track pitch and a second speed corresponding to said second track pitch based on the detection signals by said detecting means.

14. An apparatus according to claim 13, wherein said detecting means includes four detecting circuits for respectively detecting said four kinds of pilot signals included in the signals reproduced by said head means.

15. An apparatus according to claim 14, wherein said detecting means includes four flip-flops which are respectively triggered by each output signal of said four detecting circuits and are reset at every prescribed period of time.

16. An apparatus according to claim 15, wherein said detecting means further includes a logical circuit which takes a logical product of each output of said four flip-flops.

17. An information signal reproducing apparatus for reproducing information signals from a recording medium in which a large number of recording tracks, each having one of four kinds of pilot signals with different frequencies recorded on each track together with said information signals, are formed with either a first track pitch or a second track pitch, comprising:

(a) head means for tracing said recording medium for reproducing said information signals;
(b) moving means for moving said recording medium;
(c) means for detecting that only one kind out of said four kinds of pilot signals is included in the signals reproduced by said head means; and
(d) means for changing over the moving speed of said recording medium by said moving means between a first speed corresponding to said first track pitch and a second speed corresponding to said second track pitch based on the detection signals by said detecting means.

18. An apparatus according to claim 17, wherein said detecting means includes three detecting circuits for respectively detecting three kinds out of said four kinds of pilot signals included in the signals reproduced by said head means.

19. An apparatus according to claim 18, wherein said detecting means further includes circuits for taking a logical product of each output signal of said three detecting circuits.

20. An information signal reproducing apparatus for reproducing information signals from a recording medium in which a large number of recording tracks, each having one of four kinds of pilot signals with different frequencies recorded on each track successively together with the information signals, are formed with either a track pitch which has been selectively determined out of a plurality of track pitches, comprising:

(a) head means for tracing said recording medium for reproducing said information signals;
(b) moving means for moving said recording medium;
(c) three detecting means for respectively detecting three kinds out of said four kinds of pilot signals included in the signals reproduced by said head means;
(d) logical circuit means for taking a logical product of each output signal of said three detecting means; and
(e) means for discriminating said track pitch based on an output of said logical circuit means.

* * * * *